United States Patent
Ryan

(10) Patent No.: US 9,572,457 B2
(45) Date of Patent: Feb. 21, 2017

(54) STICK MIXER DRIVEN FOOD PROCESSOR

(71) Applicant: Breville Pty Limited, Botany, NSW (AU)

(72) Inventor: Garth Ryan, Helensburgh (AU)

(73) Assignee: BREVILLE PTY LTD, Alexandria, New South Wales (AU)

( * ) Notice: Subject to any disclaimer, the term of this patent is extended or adjusted under 35 U.S.C. 154(b) by 128 days.

(21) Appl. No.: 14/405,402

(22) PCT Filed: Jun. 4, 2013

(86) PCT No.: PCT/AU2013/000585
§ 371 (c)(1),
(2) Date: Dec. 4, 2014

(87) PCT Pub. No.: WO2013/181692
PCT Pub. Date: Dec. 12, 2013

(65) Prior Publication Data
US 2015/0164279 A1   Jun. 18, 2015

(51) Int. Cl.
*A47J 43/044* (2006.01)
*A47J 44/02* (2006.01)

(52) U.S. Cl.
CPC .............. *A47J 43/044* (2013.01); *A47J 44/02* (2013.01); *A47J 2043/04454* (2013.01)

(58) Field of Classification Search
CPC ...... A47J 43/044; A47J 43/06; A47J 43/0705; A47J 2043/04427; A47J 43/0755
See application file for complete search history.

(56) References Cited

U.S. PATENT DOCUMENTS

| | | | | |
|---|---|---|---|---|
| 4,049,243 A | * | 9/1977 | Kramer | A47J 36/165 366/248 |
| 6,845,932 B2 | * | 1/2005 | Ruttimann | B26D 1/29 241/296 |
| 7,028,930 B2 | * | 4/2006 | Carnevale | F16P 3/08 241/278.1 |
| 7,530,510 B2 | * | 5/2009 | Newman | A47J 43/044 241/37.5 |
| 8,814,072 B2 | * | 8/2014 | Gushwa | A47J 43/0716 241/36 |

FOREIGN PATENT DOCUMENTS

| | | | | |
|---|---|---|---|---|
| AU | WO 2013181692 A1 | * | 12/2013 | ............ A47J 43/044 |
| CN | 101138466 A | * | 3/2008 | ............ A47J 19/04 |
| DE | 2000171 A1 | * | 7/1971 | ............ A47J 17/18 |
| DE | 20 2012 103 202 U1 | * | 9/2012 | .......... A47J 43/0705 |
| DE | 20 2013 100 303 U1 | * | 9/2013 | ............ A47J 43/044 |
| EP | 2 564 745 | * | 6/2013 | ............. A47J 43/07 |

* cited by examiner

*Primary Examiner* — Tony G Soohoo
(74) *Attorney, Agent, or Firm* — Molins & Co Pty Ltd.

(57) ABSTRACT

A food processing lid is used with a cooperating bowl and a stick mixer handle. The lid has a feed tube and a recess for receiving a removeable gearbox that is driven by a stick mixer.

20 Claims, 17 Drawing Sheets

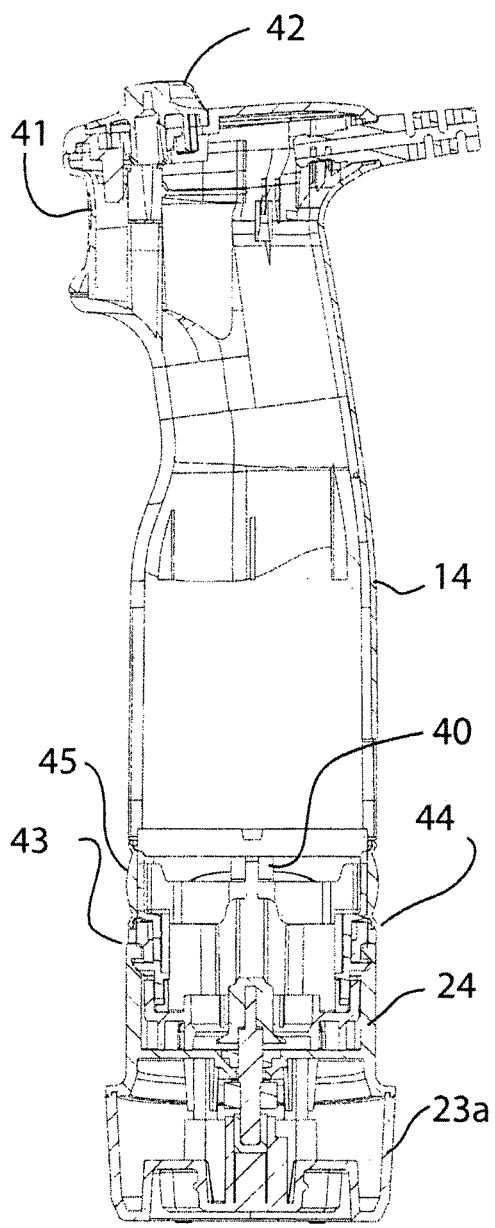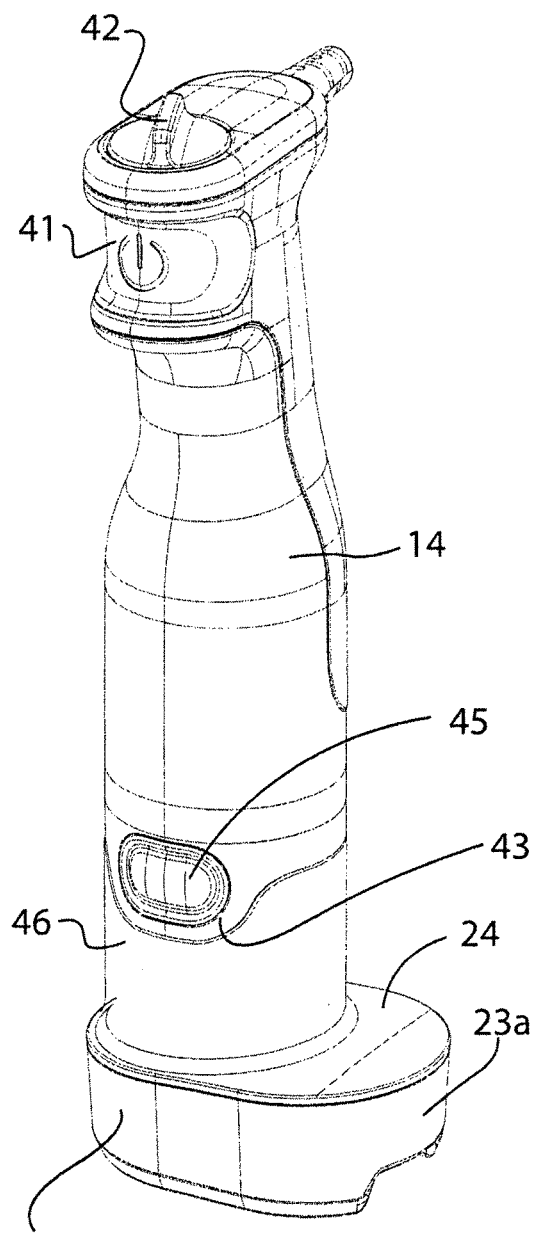
Fig. 4
Fig. 5

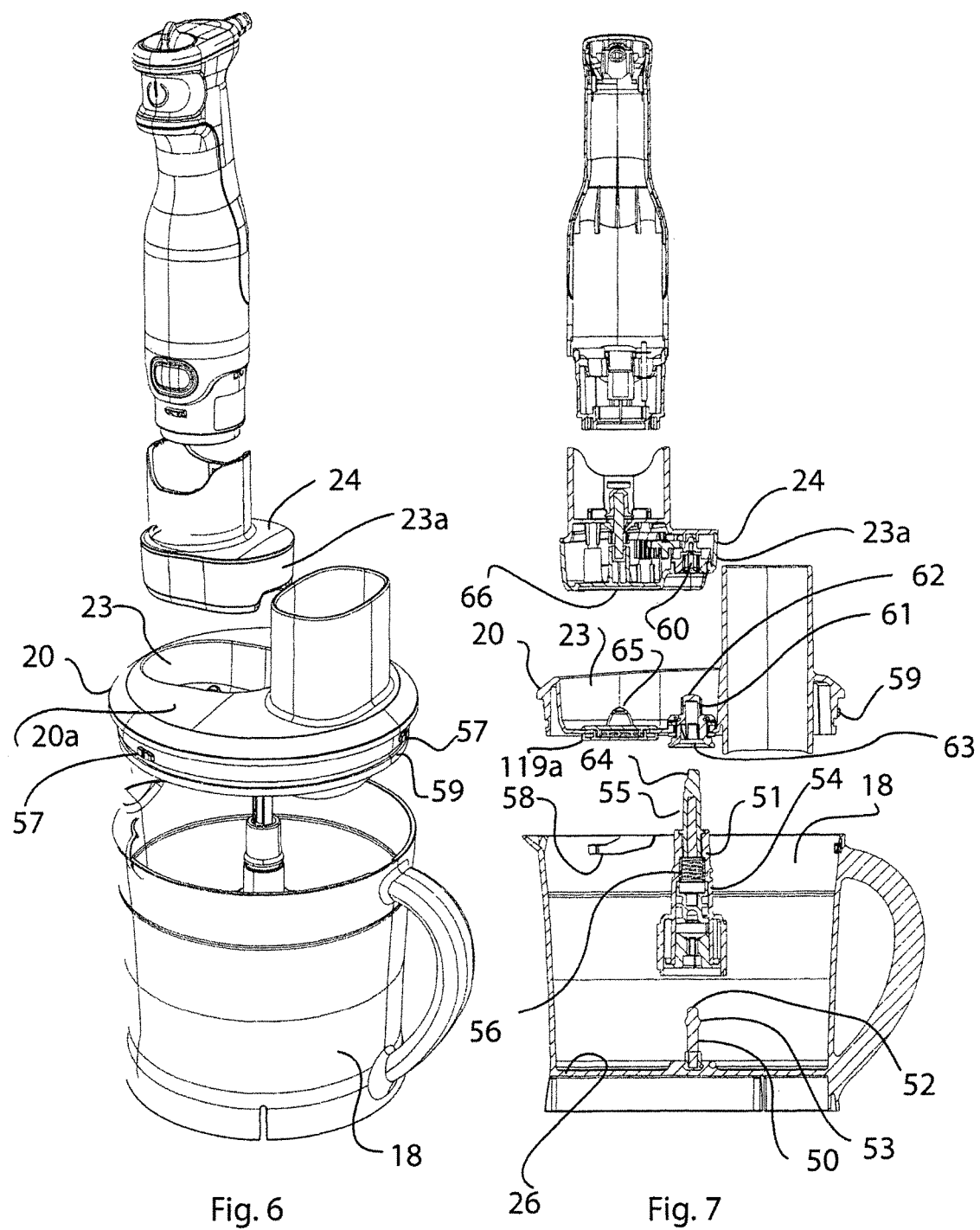

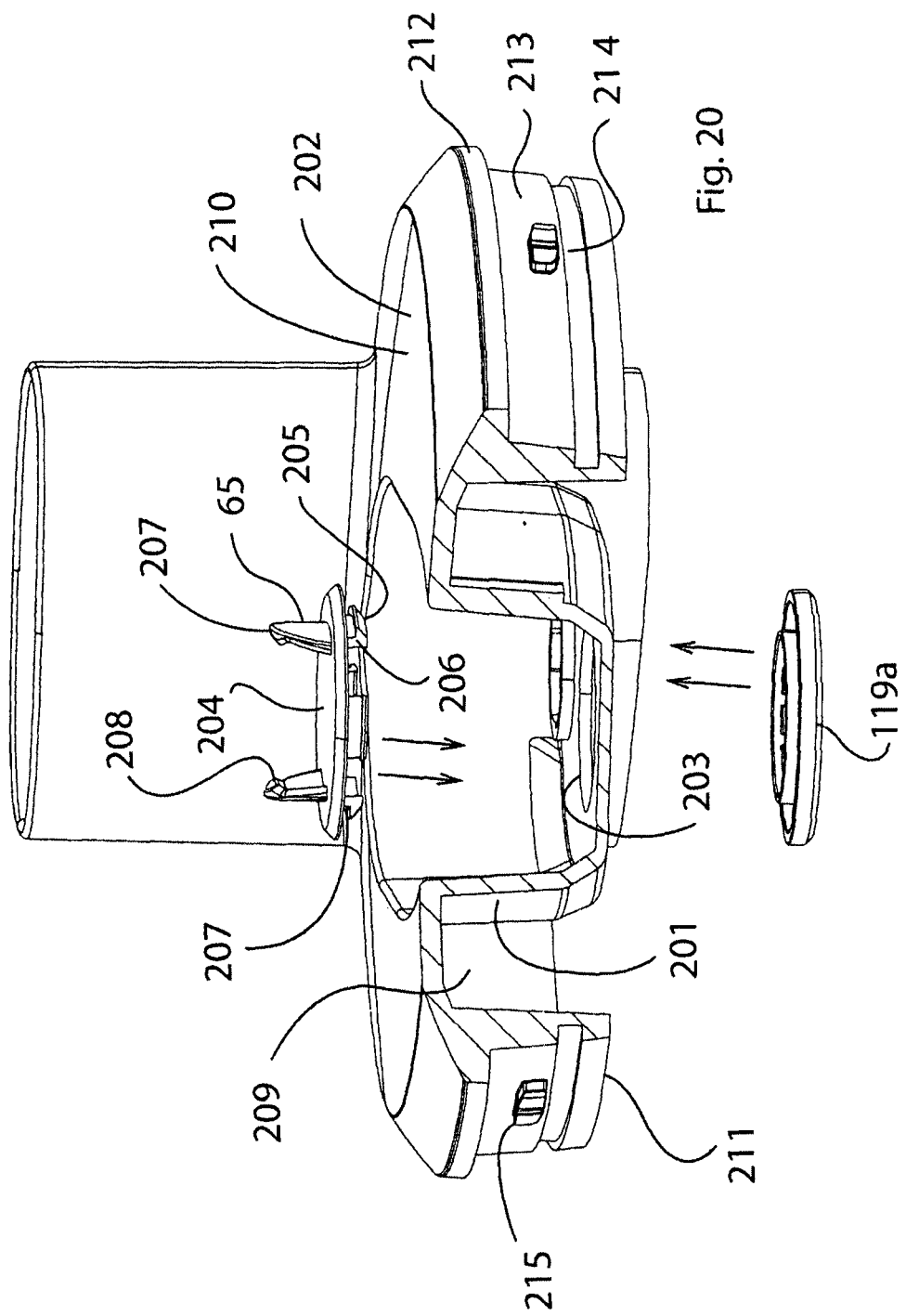

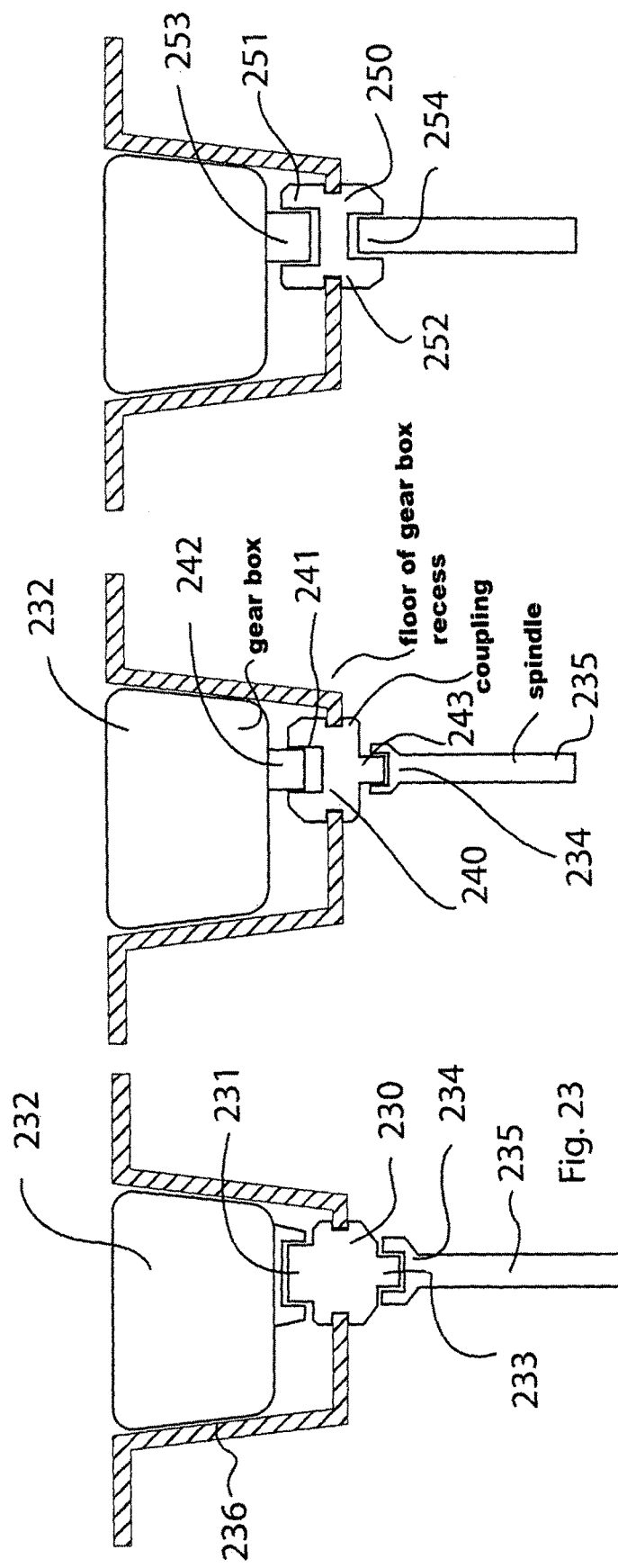

STICK MIXER DRIVEN FOOD PROCESSOR

The invention relates to food processors and more particularly to a food processor that is driven by the motor in a hand held or stick mixer.

Food processors are well known. It is also known to drive a food processor with the motor in a hand held or stick mixer. A stick mixer generally comprises a handle that houses a motor and that is mechanically coupled to a stem that features a blade at one end and coupling for the motor at the other end. Because the handle and the stem of the stick mixer can be separated the handle portion can be used to drive the rotating blade of a food processor. However, the motor output speed of the stick mixer is high (about 15,000 rpm) and a standard food processor blade requires only about 1500 rpm, a speed reducing gear box is required between the stick mixer's motor and the mechanical input of the food processor. Prior art units have a gear box that is permanently housed within the lid of the food processor. However, because of the presence of the gear box, the lid is generally not recommended for or capable of submersion or dish washer cleaning.

OBJECTS AND SUMMARY OF THE INVENTION

It is an object of the invention to provide an appliance that combines a stick mixer and a food processor. In preferred embodiments, a gear box that is interposed between the motor of the stick mixer and the mechanical input of the food processor is removable from a lid of the food processor.

In preferred embodiments, the removable gear box allows the lid to be washed in a dish washer.

In certain embodiments of the technology, the removable gear box is shielded from food by the lid.

In other embodiments, the lid that retains the gear box can be moulded in a clear material that allows visibility of the food within the food processor.

In some embodiments, the lid assembly of the food processor comprises an intermediate coupling. The intermediate coupling cannot be driven directly by the output spindle or shaft of the stick mixer. This safety feature requires the lid old be food processor to be attached to the bowl of the food processor before the spindle that holds the rotating blades of the food processor can be rotated.

In preferred embodiments, storage base is provided. The storage space allows for an orderly holding of the necessary accessories and allows one or more food processor blades to be stored between the base and the food processor's bowl.

BRIEF DESCRIPTION OF THE DRAWING FIGURES

In order that the invention be better understood, reference is now made to the following drawing figures in which:

FIG. 4 is a cross sectional view of a stick mixer, and gearbox.

FIG. 5 is perspective view of the handle and gearbox depicted in FIG. 4.

FIG. 6 is a perspective view of a food processor, bow, spindle, lid, gearbox and stick mixer handle.

FIG. 7 is a cross sectional view of the device depicted in FIG. 6.

Figure 19:
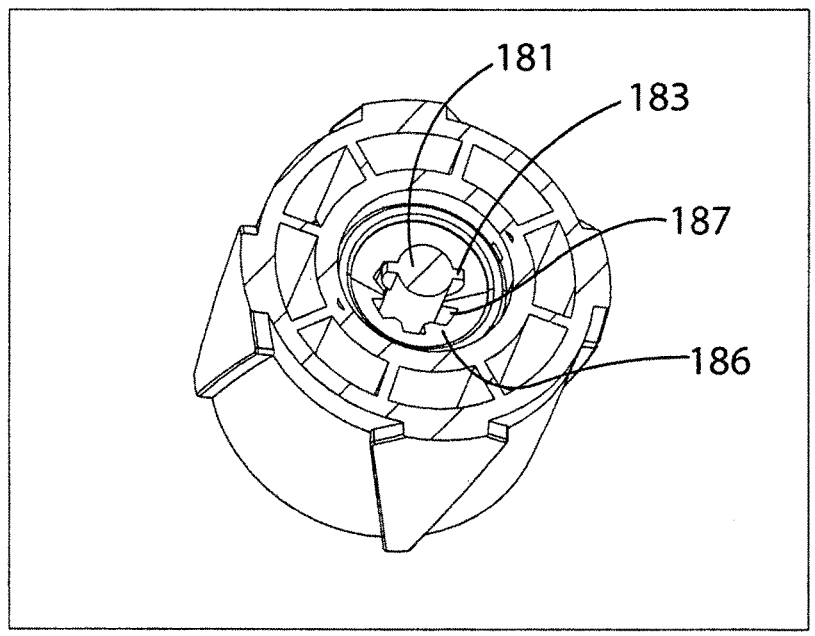
FIG. 19 is a cross section through line A-A of FIG. 18.
Figure 19A:
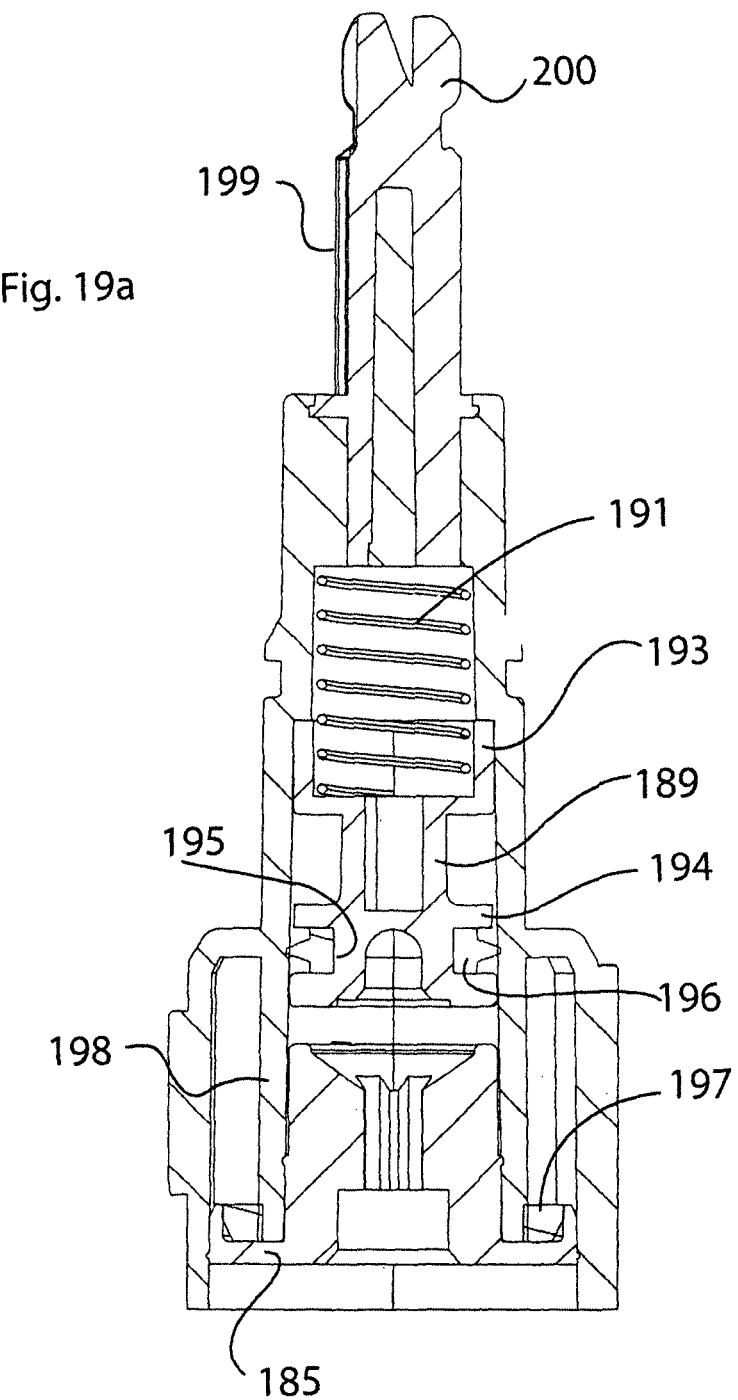

FIG. 19*a* is a cross section of a spindle.

FIG. 20 is perspective view of a lid, partially broken away.

Figure 21:
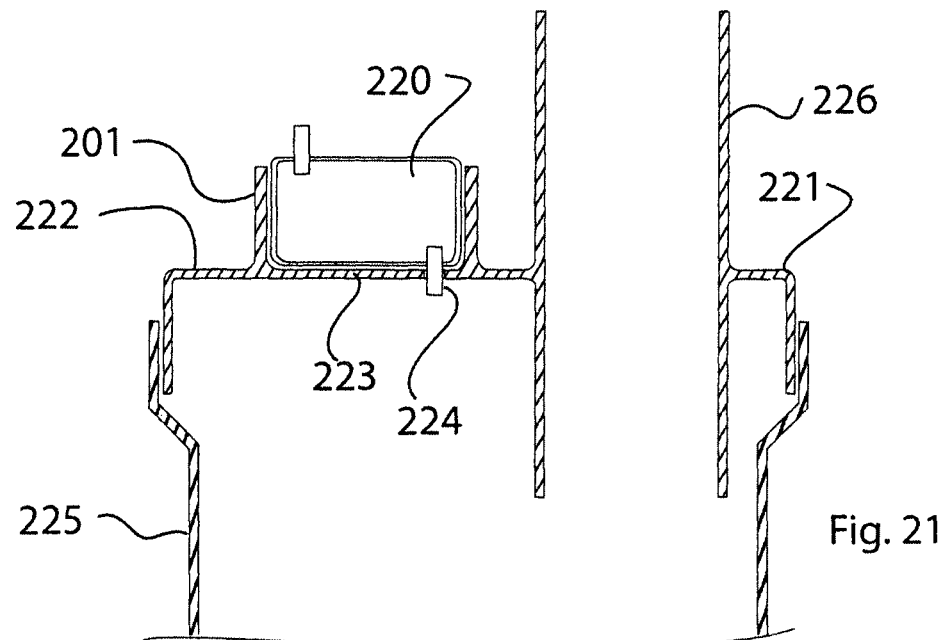

FIG. 21 is a schematic cross section of a lid, recess and removable gear box.

Figure 22:
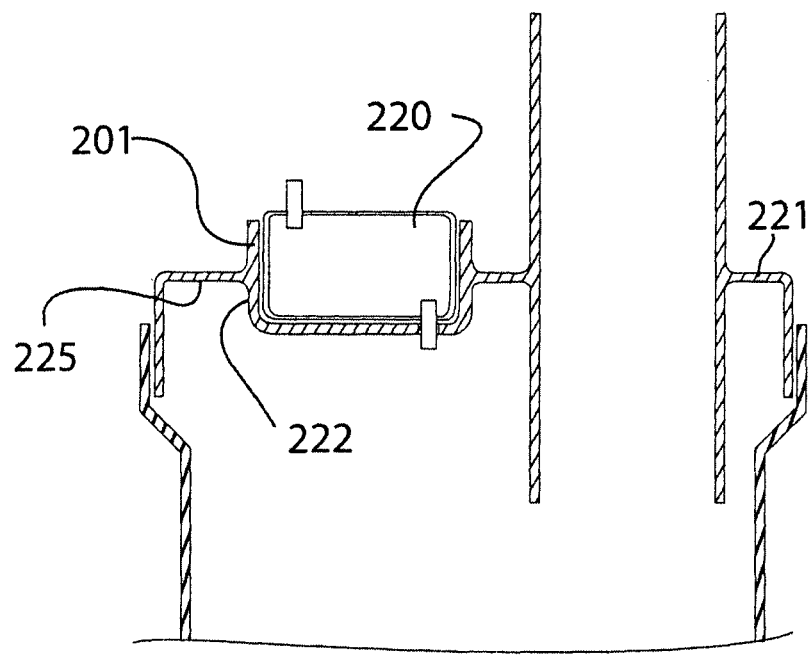

FIG. 22 is a schematic cross section of another embodiment of lid, recess and gear box.

FIG. 23 is a schematic cross section of a gear box, coupling and spindle.

FIG. 24 is a schematic cross section of another embodiment of a gear box, coupling and spindle.

FIG. 25 is a schematic cross section of yet another embodiment of gear box, coupling and spindle.

Figure 26:
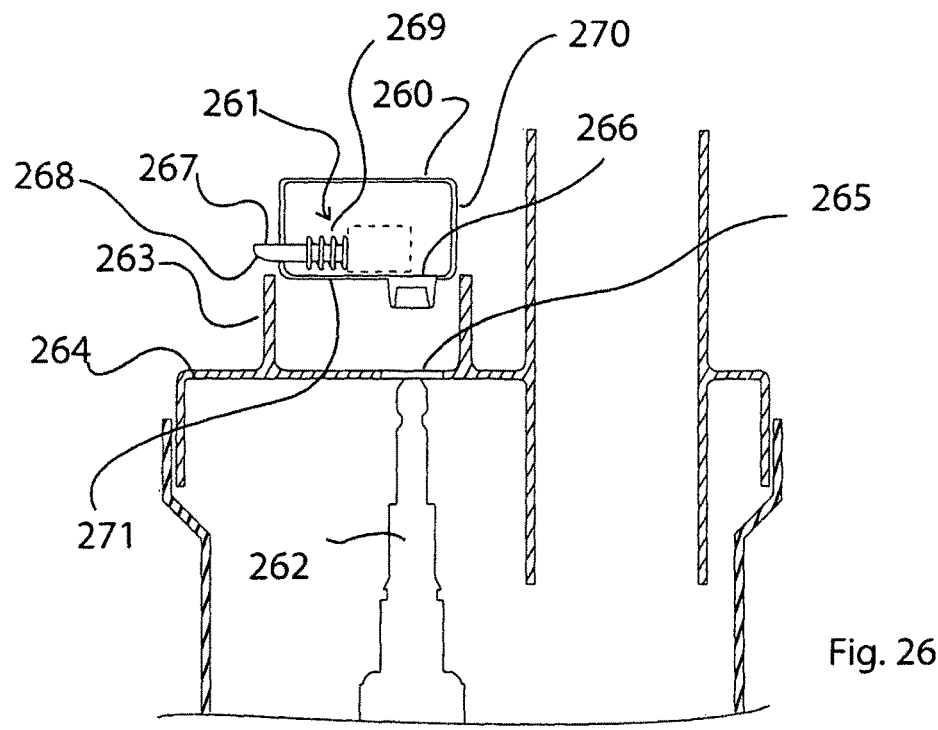

FIG. 26 is a schematic cross section of a gear box and recess, the gearbox having a safety finger shown as extended.

Figure 27:
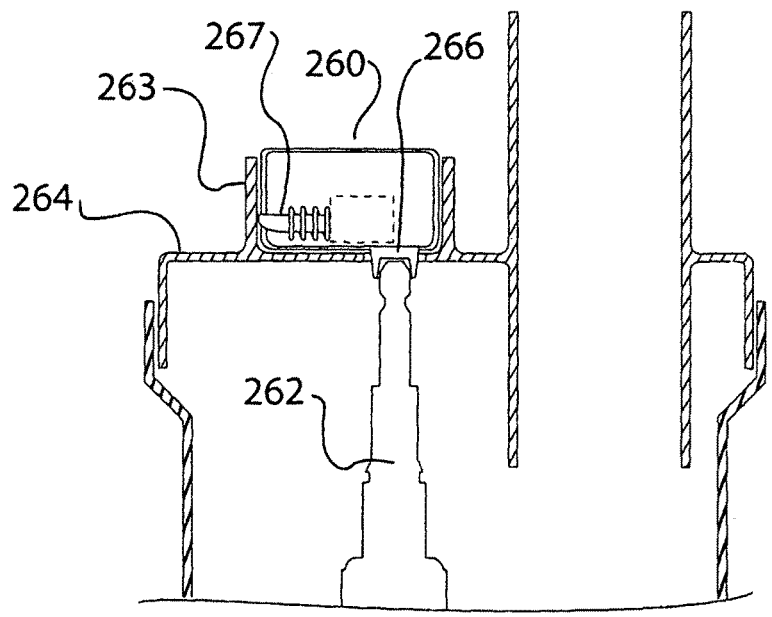

FIG. 27 is a schematic cross section of a gear box and recess, the gearbox having a safety finger shown as retracted.

BEST MODE AND OTHER EMBODIMENTS

Figure 1:
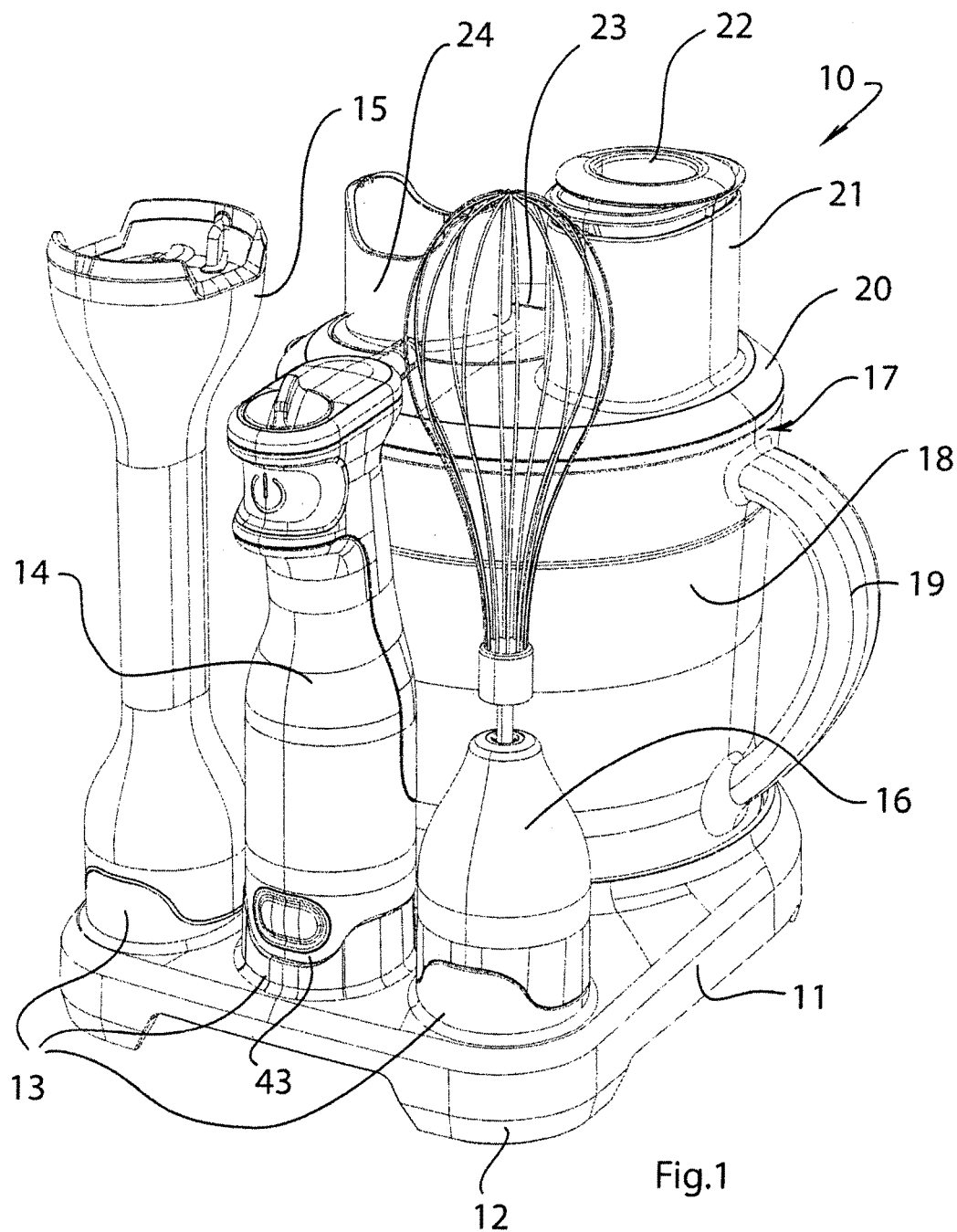
FIG. 1 is a perspective view of a stick mixer driven mod processor, base and accessories.

As shown in FIG. 1, a kitchen appliance 10 comprises a platform or base 11 having feet 12 that are adapted to rest on a kitchen countertop. The base 11 has moulded in features 12 adapted to retain the handle portion 14 of a stick mixer and the stick mixer's accessories. For example, and as shown in FIG. 1, the base 11 can support the stick mixer's removable stem and blade assembly 15 and/or the stick mixer's whisk accessory 16. As illustrated, the stick mixer component retaining features 13 are shaped to cooperate with and couple with the various components of the stick mixer 14, 15, 16.

The base 11 is also adapted to removable retain the bowl assembly 17 of a food processor. In this example, the bowl assembly 17 comprises a processing bowl 18, its integral handle 19, and the lid of the food processor 20.

In this example, the lid of the food processor 20 further comprises an integral feed tube 21 and the food processor's pusher 22. In this example, the lid also features a recess 23 that is adapted to removably receive a gear box assembly 24. In this example, the recess is shown as a concavity with respect to the upper surface 20*a*. It will be appreciated that the recess 23 may be located above the upper surface 20a or partially above and partially below the upper surface 20a of the lid 20.

Figure 2:
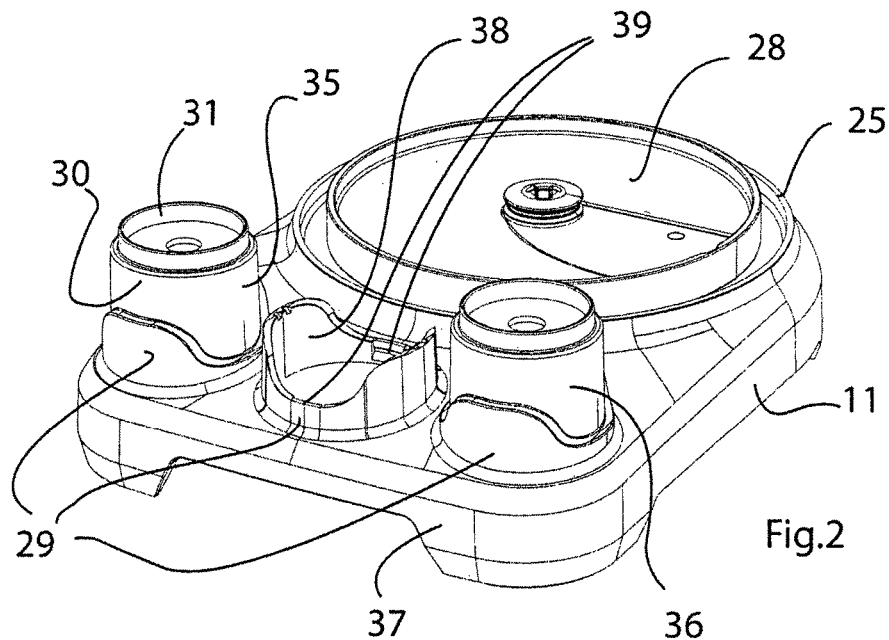
FIG. 2 is a perspective view of the base, illustrating blade storage.
Figure 3:
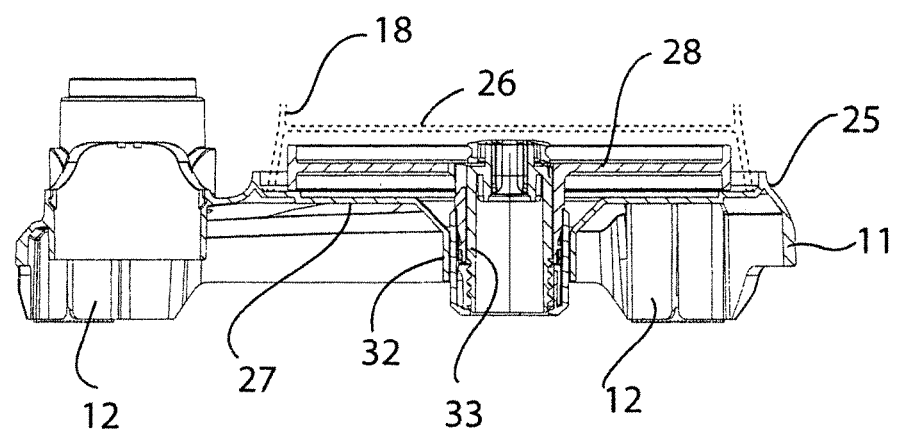
FIG. 3 is a cross section of the base and blade depicted in FIG. 2.

The base 11 is further illustrated in FIGS. 2 and 3. As shown in those figures, the base 11 further comprises a circular upstanding rim 25 that cooperates with the base of the bowl 18. When the bowl is placed within the rim 25 there is enough space between the bottom floor of the food processor 26 and the upper surface of the base 27 to accommodate one or more food processor accessories such as rotating blades or whisking discs 28.

As shown in FIG. 2, the receptacles for the stick mixer accessories each comprise a circumferential collar 29 that is configured to cooperate with the shape of the appropriate stick mixer component. In preferred embodiments, a pair of receptacles for accessories 35, 36 are located toward the front edge 37 of base 11 and located on the corners of the base 11 to either side of a third receptacle 38 that is configured and adapted to couple with the handle portion 14 of a stick mixer. To allow better mechanical engagement with the handle, the middle receptacle in this example is provided with a pair of recesses 39 located on an interior side wall of the receptacle 38 and opposite one another. These recesses 39 engage with the retractable clips located on the handle portion 14. In particularly preferred embodiments, the recesses 39 engage with the retractable clips but not tightly, thereby allowing the handle to be inserted and withdrawn from the receptacle 38 without manually disengaging or retracting the clips. These holders may also incorporate a cylindrical core 30 having mechanical features such as rims 31 to better stabilise the appropriate stick mixer component with respect to the base 11.

As best shown in FIG. 3, the upper surface 27 of the base 11, features a central opening and descending collar 32 adapted to receive the female coupling component 33 of a food processor accessory (as shown in FIG. 3).

As suggested by FIGS. 1, 4 and 5 the handle portion 14 of a stick mixer, in accordance with this example, comprises a hollow shell within which is located an electric motor having an output spindle or coupling component (either male or female, but in this example female coupling component). A half of a paired coupling arrangement is henceforth referred to as a "coupling component" 40. When two coupling components can cooperate to transmit torque they are deemed to have the same coupling configuration. If two coupling components can not cooperate, they are deemed, to have a different coupling configuration. The handle component 14 also comprises a user activable switch 41 and optional user controls such as a speed adjustment dial 42. The coupling component 40 extends from the bottom surface of the handle component and is adapted to engage cooperating couplings found within the collars of the various accessories 15, 16, associated with the handle portion 14. Ears 43, 44 that descend from the lower rim of the handle portion 14 accommodate (as is known in the art) mechanical buttons 45, that when depressed simultaneously (disengage the handle portion 14 from an accessory that is attached to it).

With reference to FIGS. 4 and 5, the accessory is a mechanical gear box 24. The gear box 24 couples to the coupling component 40 of the handle component 14. The gear box provides approximately 7-12 times reduction in motor speed and the commensurate increase in output torque. The gear box 24 features an upright collar 46 that is adapted to engage with and couple with the handle portion 14. The collar 46 in tins example has a pair of recesses and ears that cooperate with the ears 43, 44 of the handle of the stick mixer. The gear box has, in this example, an oval shaped base 47 that is received within the recess 23 in the lid 20 of the bowl 18 of the food processor. The gear box may have any shape, but rectangular and oval, ovaloid and oblong shapes are preferred because they occupy potentially less volume under the lid. In the example depicted in the specification, the gear reduction provided by the gear box is 7.98:1. The illustrated gear box has three sets of reduction gears. The first stage reduction provides 2.1:1 reduction. The second stage gear reduction provides 1.9:1 reduction. The third stage reduction provides 2:1 reduction providing an overall reduction of 7.98:1.

As shown in FIGS. 6 and 7, the bowl 18 of the food processor receives the lid 20. The bowl also contains, centrally and on the upper surface of the boor 26 a locating post, pin or stub shaft 50. The locating post 50 receives and locates the removable main spindle 51 of the food processor. The post 50 has, adjacent the free end 52 a pair of radially extending ears 53 or a circumferential bead, or other mechanical feature that cooperates with the spindle 51. The spindle 51 has an external sleeve 54 that retains the central shaft 55. In the example of FIGS. 6 and 7, the spindle 51 can only be maintained in position on the post 50 when the lid 20 is properly fitted to the bowl 18. As the lid is removed, a compression spring 56 within the spindle 51 acts to disengage the spindle 51 from the post 50. In this example, the lid 20 has male bayonet components 57 and the interior rim of the bowl 18 has female bayonet components 58. The bayonet components 57, 58 ensure that the descending rim 59 of the lid 18 is hilly inserted and temporarily locked with respect to the bowl 18 once the lid is inserted and rotated into position particularly with respect to food processor lids that incorporate an integral gear box, the lid depicted (for example) in FIG. 9, because of the descending rim 59 allows the bowl to have a greater effective volume for a given bowl size. This is because the volume between the lowest edge of the descending rim 59 and the under surface of the top of the lid forms a void 59a rather than being occupied with the operational components of a gear box that is fully contained within the lid structure.

As shown in FIGS. 6-9, the lid 20 has a recess 23 for receiving the base 23a of the gear box 24. The vertical depth of the recess 23 is approximately the same as the vertical thickness of the base of the gear box 23a. In general, the gear box will fit snugly within the recess 23 wherein it is further stabilised by the connection between the female style output coupling 60 of the gear box and the male component of the rotating intermediate coupling 61 located within the recess 23. The upper end or male component 62 of the intermediate coupling 61 fits within the female coupling component 60 located on an underside of the gear box 24. The intermediate coupling 63 extends through an opening in the floor of the recess. The through opening is in alignment with the rotational center of the spindle 51 and thus located in the center of the lid, but not necessarily the center of the recess. The intermediate coupling 61 also has a female end with a chamfered surround 63 that receives and couples to the male tip 64 of the spindle 51. The dimensions and configuration of the tip 64 are such that the tip cannot be engaged by or rotated by either the female coupling component 60 of the gear box or the output spindle 40 of the handle component 14 of the stick mixer. The rotating immediate coupling 61 is optionally permanently retained by the recess in the lid. The lower surface of the recess 23 may also have moulded into it or otherwise support one or more upstanding locator or stabilising fingers 65 (see also item 112 in FIG. 12). This optional locator finger or fingers 65 engages a cooperating recess or slot 66 formed on an under surface of the gear box 24.

Figure 8:
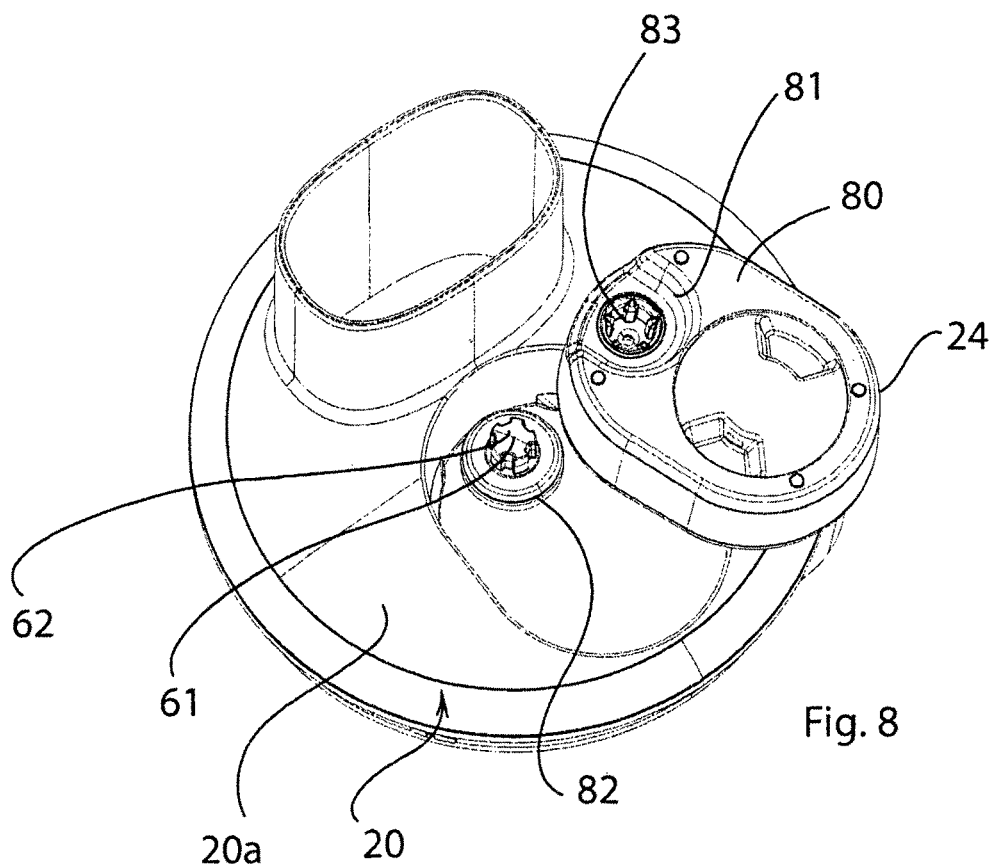
FIG. 8 is a top perspective view of a lid with gearbox recess, intermediate coupling and separate gearbox.
Figure 9:
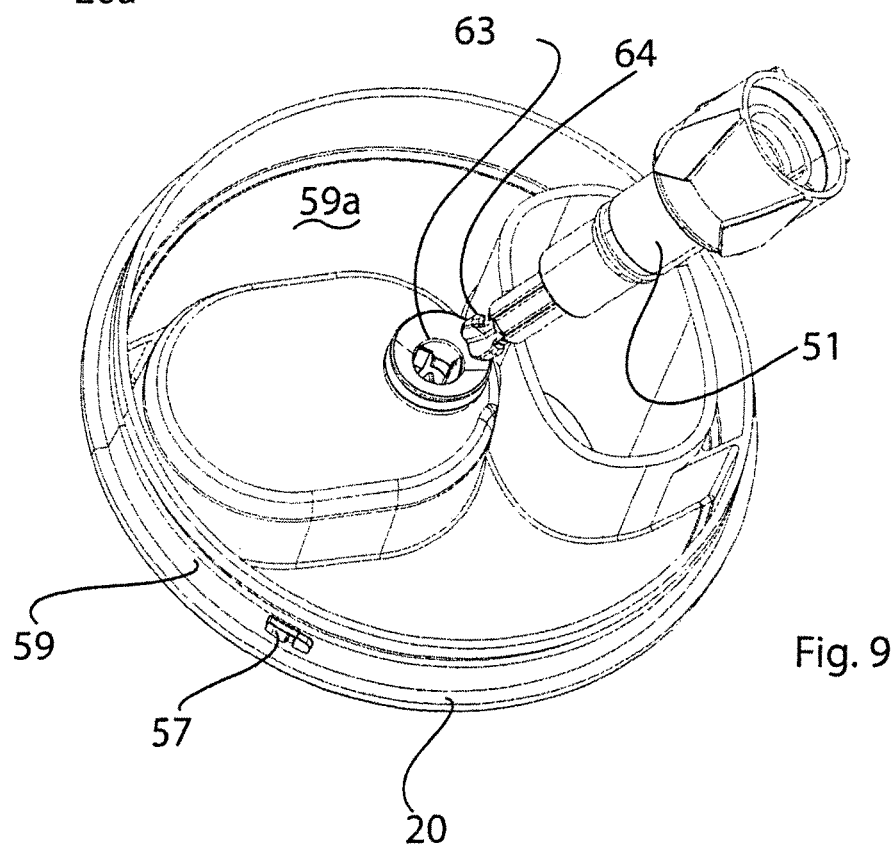
FIG. 9 is an underside perspective of the lid, spindle and spindle coupling components.

As shown in FIG. 8, an under surface 80 of the gear box 24 may have a recess or depression 81 for receiving and locating a circumferential shoulder 82 famed around, the male peril on 62 of the intermediate coupling 61. The locations of the recess 81 and shoulder 82 may be reversed. The cooperation between the recess 81 and the shoulder 82 can contribute to the stability of the gear box when it is within the recess. In this example, the male portion 62 comprises an array of five splines. The female coupling component 60, 83 located on an underside of the gear box 80 has cooperating splines that engage with the male portion 62 of the intermediate coupling 61. As shown in FIG. 9, the female component 63 of the intermediate coupling 61 comprises three splines adapted to couple with the cooperating tip 64 of the food processor's main spindle 51. The female component and the through opening that receives it, are in the middle or center of the lid, even though tire gearbox need not be central to the lid. Because the number of splines on the tip of the spindle 64 is different than the number of splines in the female component 60, 83 of the gear box female coupling component, there can be no direct engagement between, the gear box 80 and the spindle 51. Direct interconnection between the gear box coupling 83 and the tip of the spindle 64 can be prevented in other ways. Suitable ways or preventing this interconnection include: making the number of splines different on the gear box and on the spindle tip 64, making the size of the coupling components 83, 64 different and other ways of mechanically making incompatible the gear box's coupling 83 and the tip of the spindle 64. Also, the connection between the spindle tip 64 and the female coupling component 63 of the intermediate coupling is only stable when the components are both vertical. This is because the tip of the spindle 64 is rounded or in the form of a rounded bulb and will fall, roll or spill out of the female coupling component 63 of the intermediate coupling if the spindle and gear box are inclined and the spindle is not restrained at both ends by the intermediate coupling and stub shaft 50 by virtue of being installed into the bowl correctly.

As previously mentioned, the previously illustrated and describes examples contemplate that the gear box may be firmly retained within the lid's recess 23 by virtue of their cooperating shapes and sizes as well as the engagement between the female coupling component of the gear box and the male component of the intermediate coupling. However, it may be desirable to add additional mechanical stability to the interconnection between the gear box and the recess. Examples of further mechanically stabilising the gear box within the recess are depicted, by way of example, in FIGS. 10-17.

Figure 10:
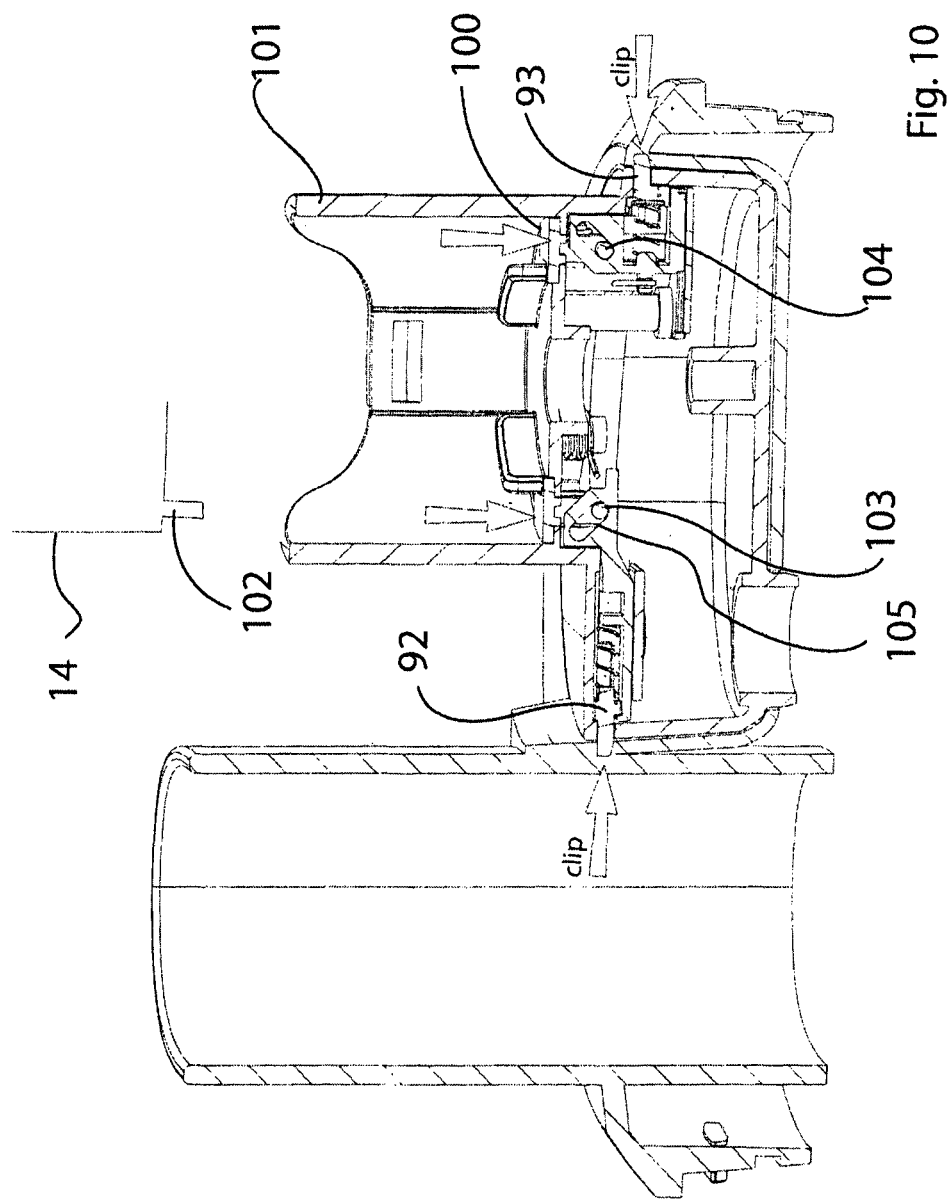
FIG. 10 is a perspective view of a gearbox and lid.

As shown in FIG. 10, the exterior surface of the gear box comprises a pair of opposed mechanical button 90, 91 located on the longitudinal or long axis of the gearbox. The buttons are covered by an elastomeric sealing membrane to prevent the ingress of food, liquids or dirt into the interior of the gear box. When depressed, the buttons each, independently, retract a radially extending mechanical clip 92, 93. Each clip 92, 93 is associated with a compression spring 94, 95 that returns the clip to the extended position when its associated button is released. Each clip has a chamfered under surface 96 that causes a retraction of the clip as it is inserted through the mouth opening of the recess 23. An opposite chamfer 97 located adjacent to and above the slot 98 that receives the clip, promotes the retraction of the clip during insertion. Squeezing the buttons 90, 91 simultaneously retracts both clips and allows for the withdrawal of the gear box from the recess.

FIG. 10 also illustrates that the central bore 106 of the female coupling component 83 (associated with an underside of the gear box 80) can contain an ejection plunger 107 that is biased or urged downwardly by a compression spring 108. As the lid is removed and the compression on the spindle tip is relieved, the plunger 107 ejects the tip of the spindle from the female coupling component 83. In this example, the plunger 107 comprises a disc-like head 109 that is attached to a central stub shaft 115 about which the spring 108 is located. Note that the female coupling component 83 and the opening in the lid that receives it are in the middle of the lid so as to align with the spindle and rotational center of the bowl that the spindle is in.

Figure 11:
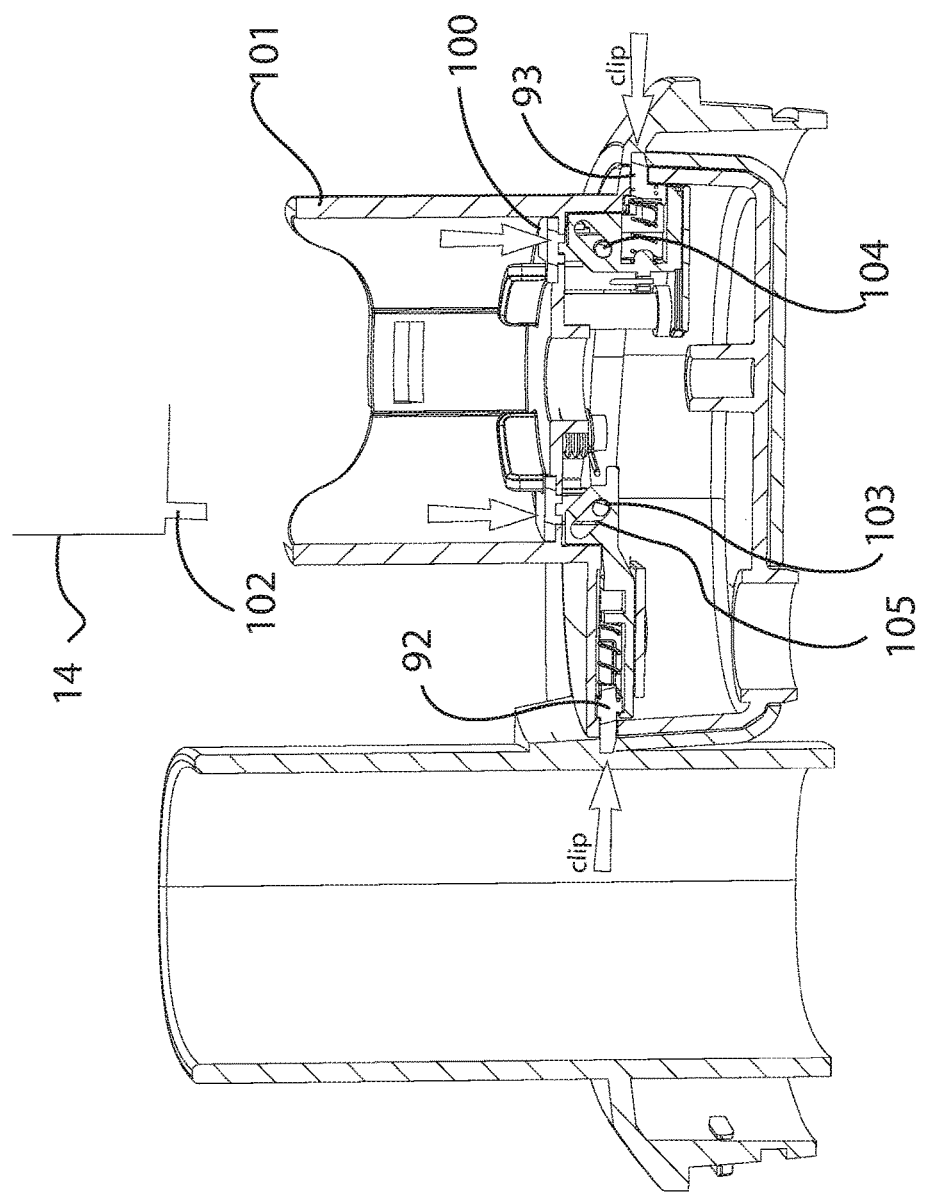
FIG. 11 is an alternate embodiment of the components depicted in FIG. 10.

Anther way of retracting the opposing clips 92, 93 is shown in FIG. 11. In this embodiment, a ring shaped or one or more crescent shaped platforms 100 are located at and preferably flush with the base of the vertical collar 101 of the gear box. When the handle component 14 is inserted into the collar 101, a downward extending lip 102 drives the platform or platforms 100 downward or toward the bowl of the food processor. Integral with the platform 100, and located beneath it, are a pair of horizontal extending pins 103, 104. Vertical movement of the platform 100 thus causes vertical movement of the pins, 103, 104. The pins ride in an inclined slot 105 formed at one end of each clip 92, 93. When the handle portion 14 is removed, the platform 100 returns to its original extended, position, and thus causes a retraction of the associated clip.

Figure 12:
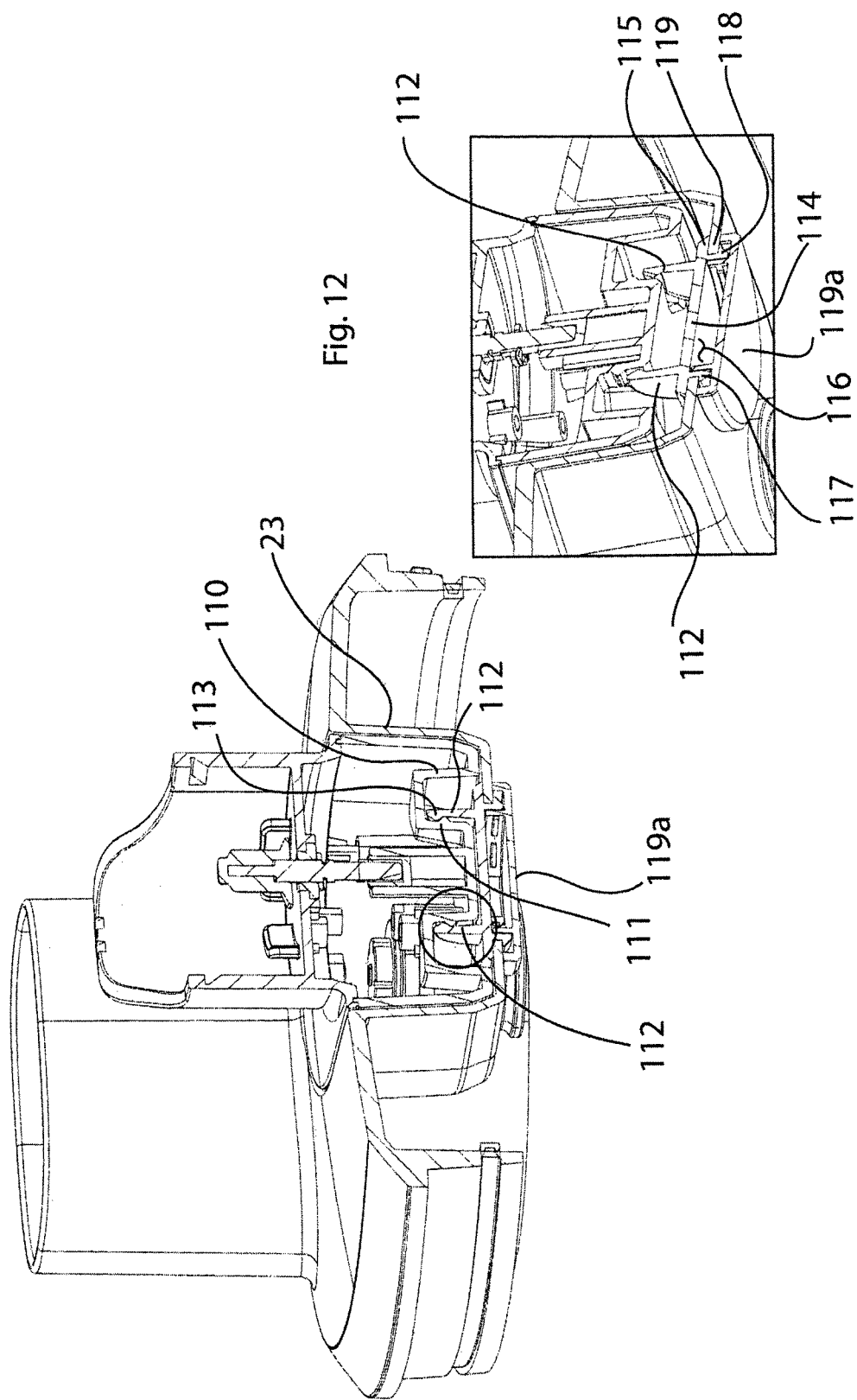
FIG. 12 is an alternate embodiment of the components depicted in FIG. 10.

As shown in FIG. 12, an underside of the gear box comprises one or more optional pockets or recesses 110. Each pocket or recess no has a protrusion, bead or lip 111. The protrusion or protrusions 111 each cooperate with an optional flexible and upstanding finger 112 that extends upwardly from the interior floor area of the recess 23. Downward pressure on the gear box is enough to flex the fingers 112 allowing the passage of the protrusion 111 past a cooperating protrusion 113 formed adjacent to a free end of the finger 112. It will be understood that in the illustrated example of FIG. 12, both the protrusion 111 and the co-operating protrusion 113 are generally symmetrical about a horizontal plane. It will also be understood that the finger may be provided as either outward or inward facing and that the finger can be either formed on the floor of the recess 23 (extending into a pocket no on the gear box) or on the gear box, extending downward into a pocket formed downwardly into the floor of the recess 23. It will be understood that the shape of the finger nor the exact shape of the protrusions 111, 113 are important to the invention. The importance of the arrangement of flexible finger 112 and co-operating protrusion in is that it provides tactile or haptic feedback to the user, indicating that the gearbox is properly seated within the gearbox receiving recess 23. In the particular example of FIG. 12, the flexible fingers 112 are both carried by an optionally separate platform 114. The outer extremity 115 of the platform 114 is larger than the opening 116 in the floor area of the recess 23 above which the fingers are located. The opening 116 allows the platform and fingers 114, 112 to be inserted from above. The platform 114 has a permanent locking detail 117 comprising a tapered head 118 that hexes past the edges of the opening 116, then locking the edge 119 of the opening 116 onto or into a gap formed between the head 118 and the platform 114. This way of inserting the platforms and fingers after the manufacture of the recess 23 provides for ease of manufacturing and cost saving. In order to cover and make hygienic the attachment between the platform 114 and the recess 23, the attachment detail 117 is covered, by an optional protective cap 119a. The exterior edges of tire cap 119a completely cover the attachment details 117, the opening 116 and the platform 114.

Figure 13:
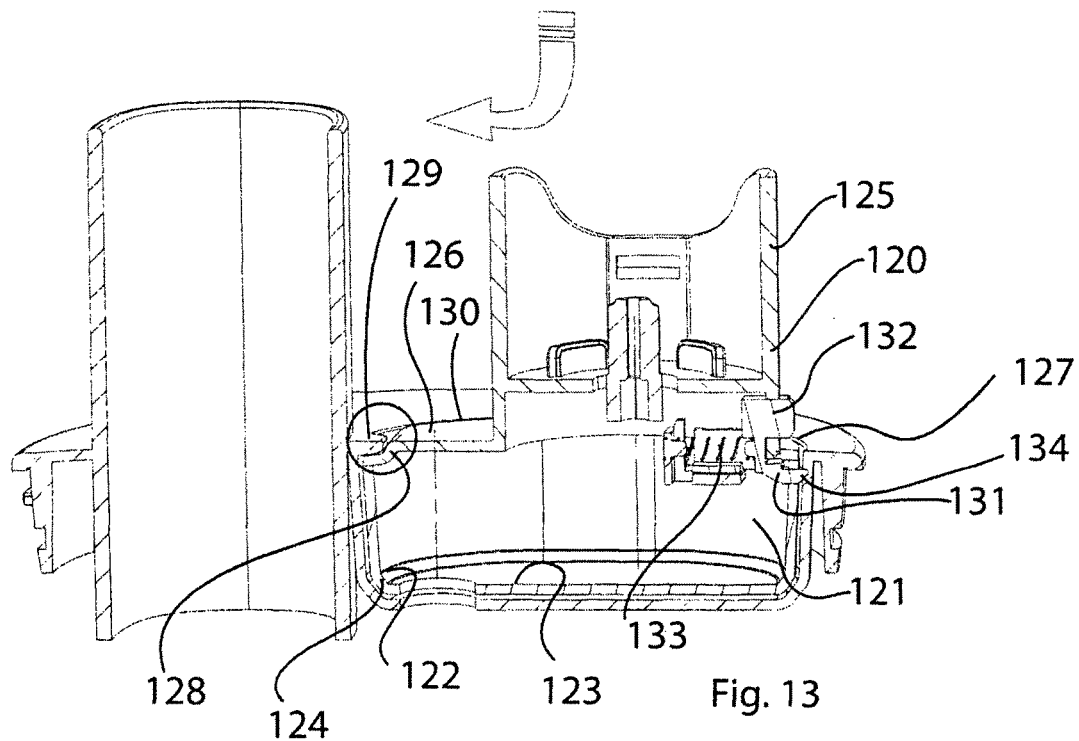
FIG. 13 is an alternate embodiment of the components depicted in FIG. 10.

As shown in FIG. 13, the gearbox assembly 120 comprises a base portion 121. The lower corners 122 of the base 123 are radiused 124. The vertical collar 125 that retains the handle component is off centre with respect to the base. Accordingly, the gear box assembly loosely resembles a foot. With reference to FIGS. 13-17, the longer portion of the base (to the left of the collar 125 is referred to as the "toe" 126 of the gear box assembly. That portion opposite the toe 126 with respect to the collar is referred to as the "heel" 127. The upper surface of the base of the gear box has a depression or step down 128 that fits below a shelf 129 that extends into the mouth area 130 of the recess in the lid. Thus, the toe can be inserted under the shelf 129 and retained by the shelf. The heel of the base incorporates a clip 131 that is retracted by pushing a mechanical button 132. The button is biased into an extended position by a compression spring or other form of resilient bias member 133. As with previous examples, the underside of clip is chamfered 134 so that it can be driven into its receiving slot in the recess without depressing the button 132. However, pressing the button will retract the clip and thereby allow the gear box assembly to be withdrawn from the recess.

Figure 14:
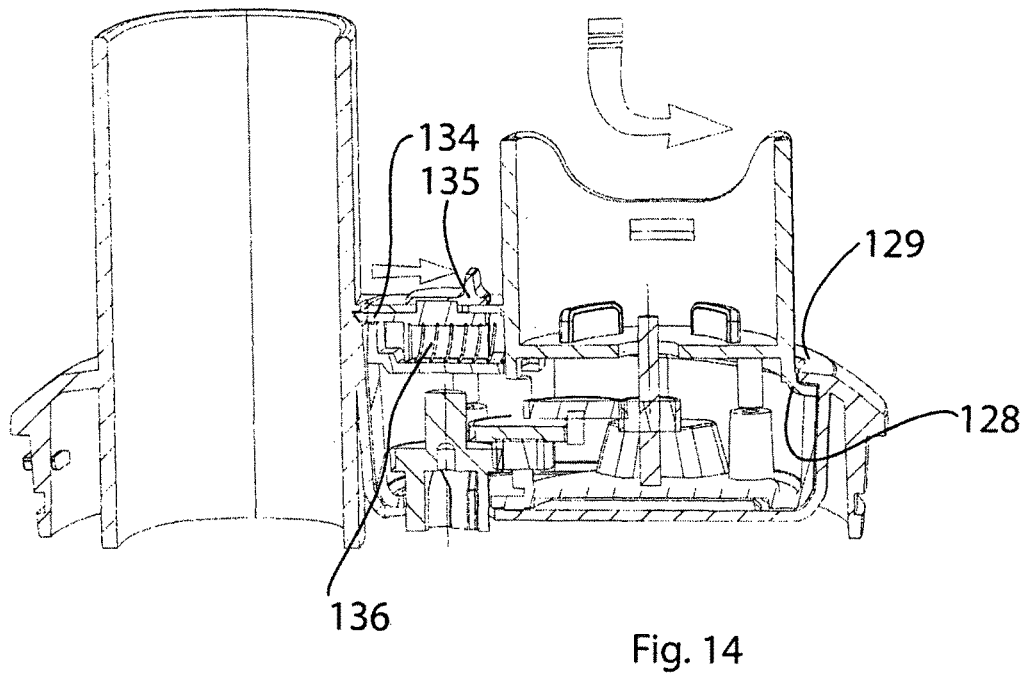
FIG. 14 is an alternate embodiment of the components depicted in FIG. 10.
Figure 15:
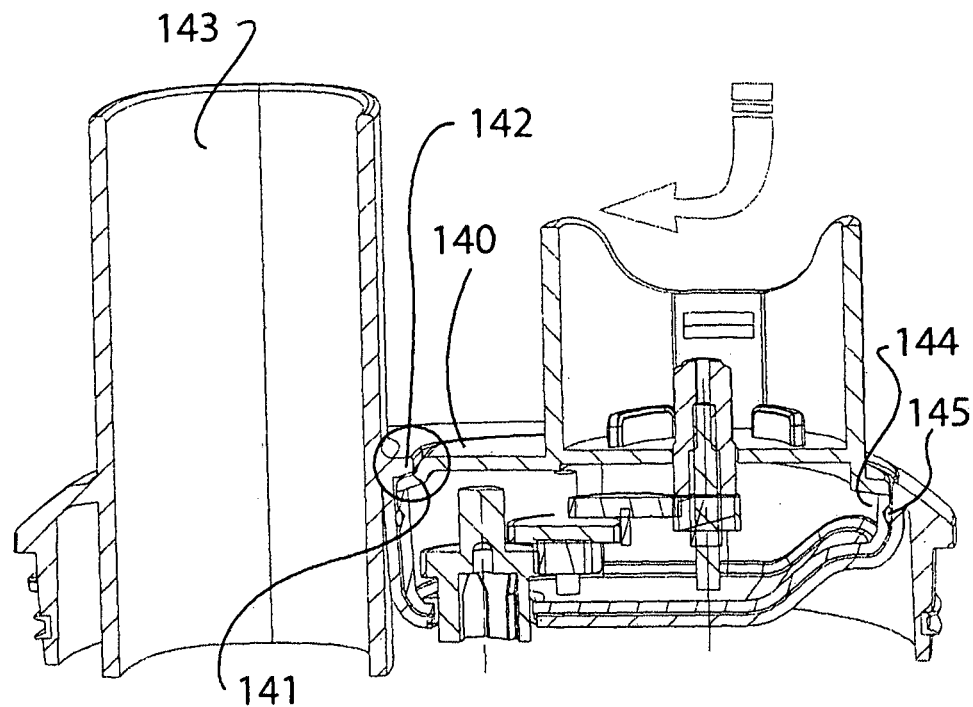
FIG. 15 is an alternate embodiment of the components depicted in FIG. 10.

With respect to FIG. 14, the location of the shelf 129 and clip 134 are reversed. Thus, the heel incorporates the depression or recess 128 and the toe incorporates the retractable clip, a mechanical sliding button 135 and the compression spring 136. In this example, the slide or button 135 is mounted on an upper surface, above the compression spring 136.

With reference to 15, the gear box assembly is provided, in the region of the toe 140 with a recess or depression 141 that is accommodated below a shelf 142 famed adjacent to the feed tube 143, the shelf extending into the mouth area of the recess formed in the lid, as previously described. In order to further stabilise the gearbox within the recess and to inhibit the migration of food in this area, an outer periphery of the body of the gear box may be provided with a circumferential groove 144 that locates and restrains an O-ring type seal 145.

Figure 16:
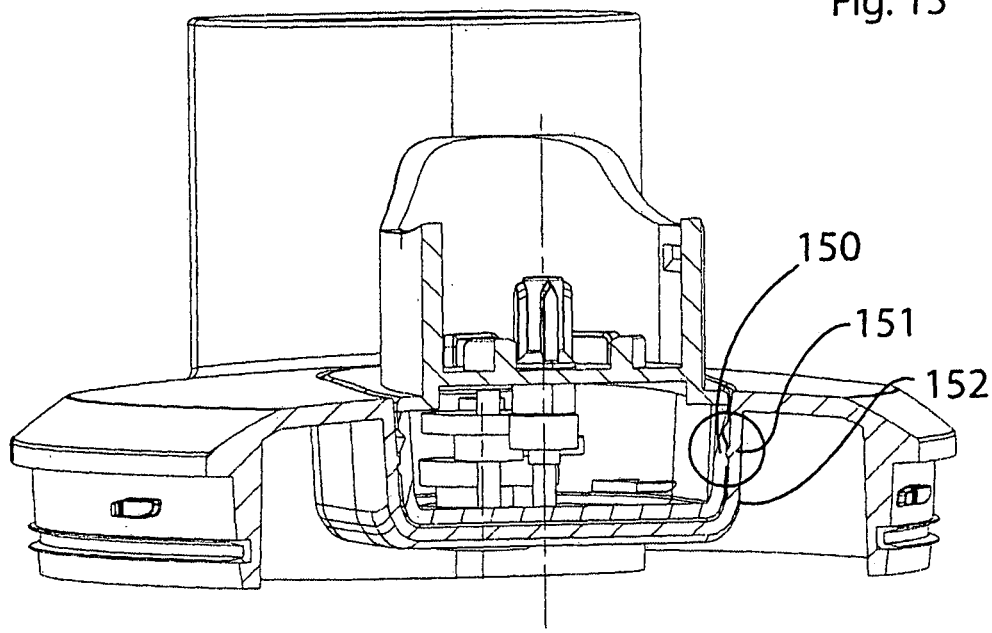
FIG. 16 is an alternate embodiment of the components depicted in FIG. 10.

As shown in FIG. 16, the circumferential walls of the gear box are provided with one or more lips, ribs or protrusions 150 that can move past but that are retained by cooperating protrusions 151 formed on the interior side walls of the recess 152. In this way, the gear box assembly can be inserted and retained and removed without the need for mechanical buttons or springs.

Figure 17:
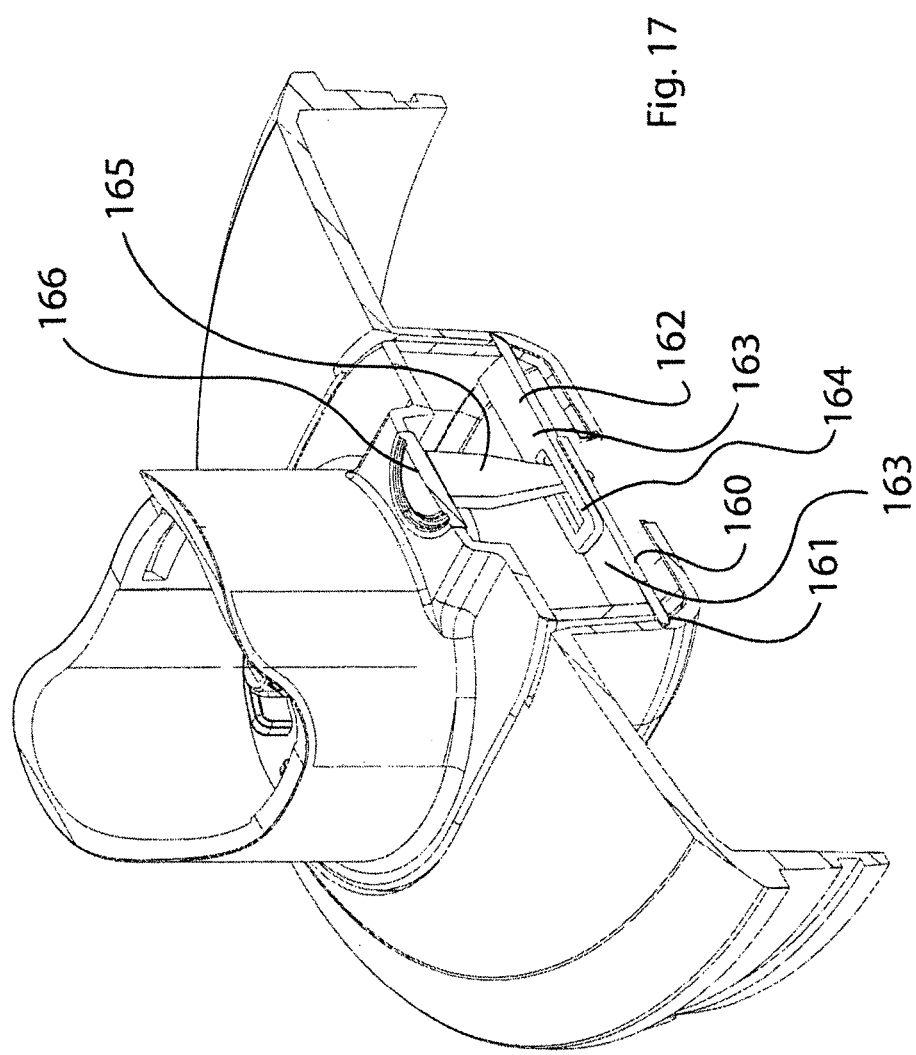
FIG. 17 is an alternate embodiment of the components depicted in FIG. 10.

As shown in FIG. 17, the gear box may incorporate a pair of opposed, sliding clips 160, each having chamfered under surfaces 161. The clips 160, 162 have clip bodies 163 that extend toward each other. Each clip body 163 terminates in a slot 164. The slots 164 overlie each other. A tapered or space-like member 165 extends through both slots 163. The spade-like member 165 is mechanically attached to a user activatable button 166. Accordingly, depressing the button 166 causes the space-dike member to further penetrate the slots 164, causing the tips of the clips to retract. When the button 166 is released, springs urge the clip bodies away from each other, thus returning the clip bodies to their resting or fully extended position. This allows a pair of opposing clips to be activated and deactivated with a single button 166.

Figure 18:
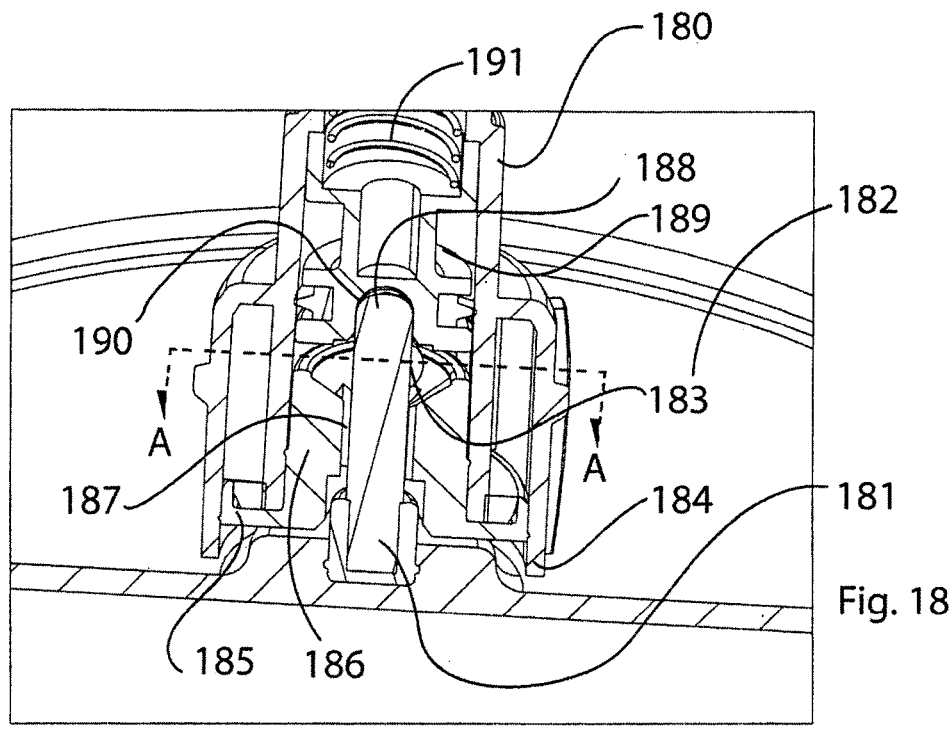
FIG. 18 is a cross sectional view through the base of a spindle and stub shaft.

As shown in FIGS. 18, 19, and 19a, a spindle 180 of a stick mixer driven food processor is driven from the top of the spindle by the removable gear box. The bottom of the spindle 180 is supported for rotation about a centrally located stub shaft 181 that is affixed to the center or rotational center of a lower surface of the food processor bowl 182. The stub shaft has one or more protruding ears 183 that are located between the lip and the base of the stub shaft 181. The lowermost portion of the spindle 180 comprises a skirt 184 within which is permanently mounted a flange 185 to which is affixed a female spline component 186. The female spline component 186 has radially extending recesses 187 that are adapted to engage the one or more ears 183. As shown in FIG. 18, the hemispherical tip 188 of the stub shaft 181 engages a sliding and reciprocating locator 189. The locator has a hemispherical recess 190 extending upward from a lower extremity for receiving the tip 188 of the stub shaft. The locator 189 is urged downwardly by a compression spring 191. When the spindle 180 is captured between the stub shaft 181 and the lid's couple, the spindle is free to rotate relative to the base 182. FIG. 19 illustrates tire disconnection between the gears 183 and the splines or recesses that are in a fixed orientation relative to the main body of the spindle. When the lid is removed, the locator 189 is urged by the spring 191 downward. This has the effect of lifting the skirt 184 of the spindle above the base surface 182. This causes an engagement between the ears 183 and the recesses 187. This effectively rotationally locks the spindle relative to the stub shaft 181, thus preventing any blade attached to the spindle from rotating when the lid is removed.

As shown in FIG. 19a, the reciprocating locator 189 comprises an upper pocket 193 for receiving the lower end of the compression spring 191. The lower extent 194 of the locator 189 further comprises a circumferential groove 195 for receiving a polymeric seal 196. The seal 196 inhibits migration of undesirable foods or liquids into the area above the seal 196. A second seal 197 is located within the flange 185 and extends between the flange and spline component 185, 186 and the outer diameter of the effective main body portion of the spindle. This seal 197 prevents food from migrating into the internal cavity of the spindle. FIG. 19a also illustrates the vertical splines 199 located below the vertically slotted coupling or tip 200 of the spindle. The vertical splines 199 are for engaging the various blades and accessories associated with a spindle.

As shown in FIG. 20, the recess 201 in the lid 202 of the food processor further comprises a lowermost opening 203 for receiving the clip-in platform 204 that supports the optional upright locating fingers 65. The platform 204 has on its underside, a clipping rim 205 preferably formed with a enlarged but tapered head 206 that defines an at least partially circumferential slot 207 adapted to engage the rim of the opening 203. The upright, fingers 65 have rounded tips 207 and, in this example, inwardly directed, beads or interference features 208. FIG. 20 also illustrates the optional cover 119a for covering the underside of the platform 204 after it is installed. FIG. 20 also illustrates the space, recess or pocket 209 formed between, the upper surface of the lid 210 and the lower rim of the lid 211. This pocket 209 effectively increases the capacity of the food processing bowl relative to those kinds of lids that incorporate an integral gear box. The lid also features an upper flange 212 below which is located a descending rim 213 having a circumferential groove 214 for polymeric seal. In this example, male bayonet features 215 are located on the descending run 213.

As shown, in FIGS. 21 and 22, there is considerable flexibility in how the recess 201 for receiving the gear box 220 is located relatively to the lid 221. In FIG. 21, the recess 201 is illustrated as comprising upright walls located on an upper surface 222 of the lid. In this example, the lower floor 223 of the recess 201 is contiguous with the flat upper surface of the lid 221. Because the lid's spindle coupling 224 is central to the bowl 225 the feed tube is located eccentrically with respect to both the lid and bowl.

As shown in FIG. 22, the recess 201 can be located, partially above the lid's upper surface 221 while a portion of the recess 222 is located below the underside 225 of the lid.

In previous examples, the rotating coupling that is mounted onto the lid and that transmits power between the gear box and spindle has been disclosed as having a male component for engaging with the gear box and a female component for engaging with the tip of the spindle. However, FIG. 23 illustrates that the coupling 230 can have a male component 231 for engaging with the gear box 232 and a male component 233 for engaging with a female coupling component 234 formed on a tip of the spindle 233. It will also be noted that the recess 236 may be tapered to receive a similarly tapered side wall of the gear box 232.

As shown in FIG. 24, the coupling 240 may also be provided with a female coupling component 241 for receiving a male output coupling component 242 of the gear box 232. In this example, the lid's coupling 240 has a male coupling component 243 for engaging a female component 234 formed on a tip of the spindle 235.

As shown in FIG. 25, the lid's coupling 230 can have upper and lower female coupling components 251, 252 for receiving male coupling features associated with both the gear box 253 and the tip of the spindle 254.

It will be appreciated that the aforementioned intermediate coupling 230, 240, 250 is configured to ensure that the coupling associated with the output of the gear box and the coupling associated with the spindle are incompatible and cannot be used together without the interposition of the intermediate coupling. Two achieve similar safety benefits, and as shown in FIGS. 26 and 27, the gearbox 260 may be provided with a lock-out mechanism 261 that prevents power from being transmitted through the gear box, to the spindle 262 unless the gear box is correctly position within the recess 263 that receives it. As shown in FIGS. 26 and 27, the recess 263 is formed, on or integral with the lid 264 of the food processor. The lid has an opening 265, positioned above and in alignment with the spindle 262. The gear box's output coupling 266, whether male or female is located, to cooperate with the opening 265 and the spindle 266 when the gear box 260 is correctly oriented in the recess.

The interlock mechanism 261 prevents the output coupling 266 from delivering rotational power to the spindle unless a safety finger 267, which projects through the side wall of the gear box 260 is retracted. In the example of FIGS. 26 and 27, the retraction of the safety finger 267 occurs when the gear box 260 is inserted, preferably fully inserted into the recess 263. The safety finger 267 may have a curved under surface 268 to facilitate insertion, of the safety finger past the upper rim of the recess 263. Preferably, the safety finger 267 is biased outward by a spring 269 or other resilient means so that it returns to an extended position as shown in FIG. 26 after removal from the recess 263. The gear box illustrated in FIGS. 26 and 27 may nave one or more safety fingers 268 so that engaging the power train between the input and output coupling 266 of the gear box 260 is made more difficult unless the gear box 260 is actually in the recess 263. The safety finger 268 can be located through an opening in either the side wall 270 or bottom wall 271 of the gear box 260.

More generally, it will be appreciated that when male and female relationships are disclosed with reference to cooperating mechanical parts such as coupling components and bayonet features, that the location of the male and female components and features can be reversed without consequence and that the recited relationships are based on example, convenience and conventional design practice in this art. Thus the terms male and female are essentially interchangeable in this specification, subject to the remainder of the practical and inventive teachings contained in the specification.

It will be appreciated that the various advantageous features disclosed with reference to the base 11 may be used in a variety of combinations and permutations and that not all the features need be incorporated in any single embodiment of the base. Further, features of the base need not be combined with features of the lid and gear box but may form a single commercial product when it is advantageous to do so. It will also be appreciated that the precise type of handle 14 and the kind of mechanical interconnection between the handle and the accessories need not be specifically those one that are disclosed by way of example in this specification. Similarly, the precise shape of the gear box and the precise manner in which it is removably attached to the lid should not be limited in scope by the useful examples disclosed in the specification. It will be appreciated that the features of the various embodiments relating the gear box and its manner of affixation to the lid can be combined across various embodiments depicted in the drawing figures and described in the specification. Where male and female components such as clips and couplings are disclosed, it will be appreciated that the orientation of the male and female components such as couplings, threads and bayonet fittings can generally be reversed without adverse consequence. Their location as disclosed represents a preferred embodiment and should not be interpreted as literal requirements of the invention.

While the present invention has been disclosed with reference to particular details of construction, these should be understood as having been provided by way of example and not as limitations to the scope of the invention.

What is claimed is:

1. A food processing lid device, for use with a bowl and a stick mixer handle, the handle having an internal electric motor and a rotating output in the form of a first coupling, wherein:
   the lid having a feed tube and a recess formed on an upper surface, the recess having within it a through opening that is located centrally with respect to the lid;
   the opening receiving an intermediate coupling that extends through the opening;
   a separate reduction gearbox that is removeably received by the recess;
   the gearbox having means for engaging the handle and a second coupling for cooperating with the first coupling and a third coupling that cooperates with the intermediate coupling.

2. The device of claim 1, wherein:
   the intermediate coupling is retained by the recess and rotates relative to the recess.

3. The device of claim 2, wherein:
   an under surface of the gearbox has a recess for receiving and locating a the intermediate coupling.

4. The device of claim 2, wherein:

an underside of the gear box comprises one or more pockets; and each pocket cooperates with an upstanding flexible finger that extends upwardly from an interior floor area of the recess so as to engage with it.

5. The device of claim 2, wherein:

the intermediate coupling has a female end with a chamfered surround.

6. The device of claim 1, wherein:

the intermediate coupling is permanently retained by the lid and the gearbox is not permanently retained by the lid.

7. The device of claim 6, wherein:

the first coupling and the third coupling do not have the same coupling configuration.

8. The device of claim 7, further comprising:

the stick mixer handle.

9. The device of claim 7, further comprising:

the bowl, the bowl having a bayonet engagement with the lid.

10. The device of claim 6, wherein:

the gearbox comprises a mechanical button that retracts a clip that retracts when the button is depressed, the clip cooperating with a slot in the recess.

11. The device of claim 10, further comprising:

a second mechanical button that retracts a second clip that retracts when the second button is depressed, the second clip cooperating with a second slot in the recess.

12. The device of claim 10, further comprising:

a mechanical second button that retracts a second clip that retracts when the second button is depressed, the second clip cooperating with a second slot in the recess.

13. The device of claim 6, wherein:

the gear box comprises an upright collar that is adapted to engage with and couple with the stick mixer.

14. A food processing lid device, for use with a bowl and a stick mixer handle, the handle having an internal electric motor and a rotating output in the form of a first coupling, wherein:

the lid having a feed tube and a recess formed on an upper surface, the recess having within it a through opening;

the recess receiving and retaining a reduction gearbox having a second coupling that cooperates with the first coupling and a third coupling for driving a spindle of a food processing accessory in the bowl.

15. The device of claim 14, wherein:

the third coupling is a female coupling component having an ejection plunger that is biased downwardly for ejecting the spindle from the female coupling component.

16. The device of claim 14, wherein:

the through opening is located in the center of the lid.

17. The device of claim 14, wherein:

the gearbox comprises a mechanical button that retracts a clip that retracts when the button is depressed, the clip cooperating with a slot in the recess.

18. The device of claim 14, wherein:

an underside of the gear box comprises one or more pockets; and each pocket cooperates with an upstanding flexible finger that extends upwardly from an interior floor area of the recess so as to engage with it.

19. The device of claim 14, wherein:

the gear box comprises an upright collar that is adapted to engage with and couple with the stick mixer.

20. The device of claim 14, wherein:

the gear box comprises an upright collar that is adapted to engage with and couple with the stick mixer.

* * * * *

US009572457C1

(12) EX PARTE REEXAMINATION CERTIFICATE (11717th)
United States Patent
Ryan

(10) Number: US 9,572,457 C1
(45) Certificate Issued: Sep. 1, 2020

(54) STICK MIXER DRIVEN FOOD PROCESSOR

(71) Applicant: Breville Pty Limited, Botany, NSW (AU)

(72) Inventor: Garth Ryan, Helensburgh (AU)

(73) Assignee: BREVILLE PTY LIMITED, Botany (AU)

Reexamination Request:
No. 90/014,440, Jan. 24, 2020

Reexamination Certificate for:
Patent No.: 9,572,457
Issued: Feb. 21, 2017
Appl. No.: 14/405,402
PCT Filed: Jun. 4, 2013
PCT No.: PCT/AU2013/000585
§ 371 (c)(1),
(2) Date: Dec. 4, 2014
PCT Pub. No.: WO2013/181692
PCT Pub. Date: Dec. 12, 2013

(51) Int. Cl.
*A47J 43/044* (2006.01)
*A47J 44/02* (2006.01)

(52) U.S. Cl.
CPC ............ *A47J 43/044* (2013.01); *A47J 44/02* (2013.01); *A47J 2043/04454* (2013.01)

(58) Field of Classification Search
None
See application file for complete search history.

(56) References Cited

To view the complete listing of prior art documents cited during the proceeding for Reexamination Control Number 90/014,440, please refer to the USPTO's public Patent Application Information Retrieval (PAIR) system under the Display References tab.

*Primary Examiner* — Norca L. Torres Velazquez

(57) ABSTRACT

A food processing lid is used with a cooperating bowl and a stick mixer handle. The lid has a feed tube and a recess for receiving a removeable gearbox that is driven by a stick mixer.

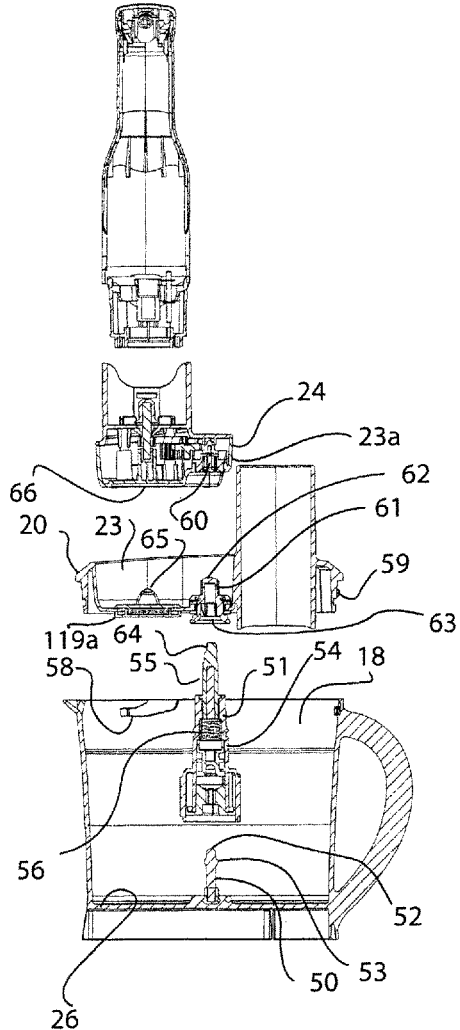

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 20 is cancelled.

Claims 1 and 14 are determined to be patentable as amended.

Claims 3, 13, 14, 16 and 19, dependent on an amended claim, are determined to be patentable.

New claims 21 and 22 are added and determined to be patentable.

Claims 2, 4-12, 15, 17 and 18 were not reexamined.

1. A food processing lid device, for use with a bowl and a stick mixer handle, the handle having an internal electric motor and a rotating output in the form of a first coupling, *the bowl including a drive shaft to be rotated*, wherein *the lid device includes*:
   [the] *a* lid having a feed tube and a recess formed on an upper surface, the recess having within it a through opening that is located centrally with respect to the lid;
   [the opening receiving] an intermediate coupling [that extends] *mounted in the lid and extending* through the opening;
   a separate reduction gearbox that is removeably received by the recess;
   the gearbox having means for engaging the handle and a second coupling for cooperating with the first coupling and a third coupling that cooperates with the intermediate coupling *so that the stick mixer handle can drive the drive shaft*.

14. A food processing lid device, for use with a bowl and a stick mixer handle, the handle having an internal electric motor and a rotating output in the form of a first coupling, wherein *the device includes*:
    [the] *a* lid having a feed tube and a recess formed on an upper surface, the recess having within it a through opening;
    the recess receiving and retaining a reduction gearbox having a second coupling that cooperates with the first coupling; and
    a third coupling for driving a spindle of a food processing accessory in the bowl, *the third coupling mounted in the lid and engageable and drivable by the reduction gear box*.

21. *A food processor appliance comprising:*
    *a bowl including a drive shaft to be rotated;*
    *a stick mixer handle, the handle having an internal electric motor and a rotating output in the form of a first coupling; and*
    *a food processing lid device including*
        *a lid having a feed tube and a recess formed on an upper surface, the recess having within it a through opening that is located centrally with respect to the lid,*
        *an intermediate coupling mounted in the lid and extending through the opening;*
        *a separate reduction gearbox that is removably received by the recess, the gearbox having means for engaging the handle and a second coupling for cooperating with the first coupling and a third coupling that cooperates with the intermediate coupling so that the stick mixer handle can drive the drive shaft;*
    *wherein the stick mixer is mounted in said recess so that the rotating output is engaged with the intermediate member to drive the intermediate member, with the intermediate member engaged with the drive shaft to drive the drive shaft.*

22. *A food processing lid device, for use with a bowl and a stick mixer handle, the handle having an internal electric motor and a rotating output in the form of a first coupling, wherein:*
    *the lid having a feed tube and a recess formed on an upper surface, the recess having within it a through opening that is located centrally with respect to the lid;*
    *the opening receiving an intermediate coupling that extends through the opening;*
    *a separate reduction gearbox that is removably received by the recess;*
    *the gearbox having means for engaging the handle and a second coupling for cooperating with the first coupling and a third coupling that cooperates with the intermediate coupling,*
    *wherein the intermediate coupling is retained by the recess and rotates relative to the recess.*

* * * * *